(12) United States Patent
Liu et al.

(10) Patent No.: US 12,370,744 B2
(45) Date of Patent: Jul. 29, 2025

(54) 3D PRINTER AND FEED DETECTION APPARATUS THEREOF

(71) Applicant: Shenzhen Creality 3D Technology Co., Ltd., Shenzhen (CN)

(72) Inventors: Hui-Lin Liu, Shenzhen (CN); Jing-Ke Tang, Shenzhen (CN); Chun Chen, Shenzhen (CN); Dan-Jun Ao, Shenzhen (CN); Sheng-Yuan Lv, Shenzhen (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 100 days.

(21) Appl. No.: 18/038,180

(22) PCT Filed: Dec. 30, 2020

(86) PCT No.: PCT/CN2020/141272
§ 371 (c)(1),
(2) Date: May 22, 2023

(87) PCT Pub. No.: WO2022/105034
PCT Pub. Date: May 27, 2022

(65) Prior Publication Data
US 2024/0001613 A1 Jan. 4, 2024

(30) Foreign Application Priority Data

Nov. 20, 2020 (CN) .......................... 202022705982.8

(51) Int. Cl.
*B29C 64/321* (2017.01)
*B29C 64/118* (2017.01)
(Continued)

(52) U.S. Cl.
CPC .......... *B29C 64/321* (2017.08); *B29C 64/118* (2017.08); *B29C 64/393* (2017.08); *B33Y 30/00* (2014.12); *B33Y 50/02* (2014.12)

(58) Field of Classification Search
CPC ........................... B29C 64/118; B29C 64/321
See application file for complete search history.

(56) References Cited

U.S. PATENT DOCUMENTS 9,050,788 B2 * 6/2015 Swanson ............... B29C 64/106
10,144,182 B2 * 12/2018 Ho .......................... B33Y 50/02
(Continued)

FOREIGN PATENT DOCUMENTS

CN 203496156 U * 3/2014 ............. B29C 31/00
CN 104309130 A 1/2015
(Continued)

*Primary Examiner* — Atul P. Khare
(74) *Attorney, Agent, or Firm* — ScienBiziP, P.C.

(57) ABSTRACT

A feed detection apparatus of a 3D printer, comprising a gear, a measurement device, a support, and a compression assembly. The gear is provided on the support to abut against a filament material, and rotates along with a movement of the filament material. The measurement device is placed on the support to measure a rotating speed of the gear, and determines a feeding status of the filament material according to a measurement result. The compression assembly comprises a connection member and an abutment member; the connection member is provided between the support and the abutment member; the abutment member is used for regulating a pressure of the connecting member applied on the support so as to enable the gear to abut against the filament material.

20 Claims, 4 Drawing Sheets

(51) Int. Cl.
*B29C 64/393* (2017.01)
*B33Y 30/00* (2015.01)
*B33Y 50/02* (2015.01)

(56) References Cited

U.S. PATENT DOCUMENTS

| | | | |
|---|---|---|---|
| 11,065,811 B2 * | 7/2021 | MacNeish, III | B29C 64/393 |
| 11,192,308 B2 * | 12/2021 | Sharma | B29C 64/118 |
| 2011/0076495 A1 * | 3/2011 | Batchelder | D01D 5/42 |
| | | | 264/145 |
| 2017/0028642 A1 | 2/2017 | Ho et al. | |
| 2017/0313541 A1 | 11/2017 | Wu | |
| 2018/0143610 A1 | 5/2018 | Hsu et al. | |
| 2019/0283330 A1 * | 9/2019 | Sharma | B65H 63/00 |

FOREIGN PATENT DOCUMENTS

| | | | | |
|---|---|---|---|---|
| CN | 104552946 A | * | 4/2015 | B22F 3/115 |
| CN | 208133617 U | * | 11/2018 | B29C 64/20 |
| CN | 109016512 A | | 12/2018 | |
| CN | 208180276 U | * | 12/2018 | B29C 64/386 |
| CN | 109703013 A | | 5/2019 | |
| CN | 110744819 A | | 2/2020 | |
| CN | 111531888 A | * | 8/2020 | B29C 64/321 |
| CN | 111716722 A | * | 9/2020 | B29C 64/321 |
| CN | 113071102 A | * | 7/2021 | B29C 64/321 |
| KR | 101572185 B1 | * | 11/2015 | B33Y 50/02 |
| WO | WO-2017088754 A1 | * | 6/2017 | B33Y 40/00 |
| WO | WO-2024066485 A1 | * | 4/2024 | B33Y 40/00 |

\* cited by examiner

3D PRINTER AND FEED DETECTION APPARATUS THEREOF

FIELD

The present application relates to the technical field of 3D printing, particularly to a 3D printer with a feed detection apparatus.

BACKGROUND

Driven by the intelligent advancement of computer digital technology, 3D printing technology has been applied in an increasingly wide range of fields. In particular, FDM (Fused Deposition Modeling, FDM) technology has become increasingly popular with DIY enthusiasts. FDM technology involves heating solid low-melting-point filament materials to a semi-melted state and then stacking them layer by layer. Therefore, the quality of the material extruded from the printing nozzle has a significant impact on the 3D printing effect. Throughout the entire processing process, the stability of the material extruding is an important factor in determining the accuracy and the surface quality of 3D printing. However, the 3D printers currently on the market, an estimate of the remaining amount of printing materials is required before the 3D printing process can begin, and a determination whether there is enough material to meet the printing requirements is also needed. If the printing nozzle continues to print when there is not enough material, a breakage of material, or a blocking of material flow, the printing process may damage the already printed object, causing irreparable losses and unnecessary waste of printing materials. As a result, various detection devices have appeared on the market to detect the operational status of printing materials. However, the existing detection devices have a complex structure, poor reliability, and may only be used to detect material shortages or breakages. The existing detection devices cannot detect whether the material spool is tangled or whether the printing nozzle is blocked, which is an urgent problem need to be solved by professionals in this field.

SUMMARY

Given the above situation, the present application discloses a 3D printer and a feed detection apparatus thereof. The feed detection apparatus compresses a gear to a filament material through a simple combination of connecting member and compression member, allowing the filament material to drive the gear to move. By using a measurement device to measure a rotating speed of the gear and determining a feeding status of the filament material based on a measurement result, the feed detection apparatus can effectively detect multiple problems associated with filament material feeding, such as shortages, breakages, spool tangles, or nozzle blockages.

In one embodiment of the present application, the feed detection apparatus for a 3D printer includes a gear, a measurement device, a support member, and a compression assembly. The gear is mounted on the support to abut against the filament material, and the gear rotates with a movement of the filament material. The measurement device is mounted on the support to measure a rotating speed of the gear, and determines a feeding status of the filament material based on a measurement result.

The compression assembly is located on a side of the support back away from the filament material. The compression assembly includes a connecting member and a pressing member, the connecting member is placed between the support and the pressing member, the pressing member is configured to regulate a pressure of the connecting member applied on the support, so that the gear abuts against the filament material.

In some embodiments, a positioning hole is defined on the support, a center hole is defined on the gear, the positioning hole and the center hole are coaxially arranged.

In some embodiments, the connecting member is an elastic element, two ends of the connecting member respectively abut against the support and the pressing member.

In some embodiments, a positioning protrusion is positioned on a side of the support facing the compression assembly, the positioning protrusion is inserted into the connecting member.

In some embodiments, the feed detection apparatus further includes a housing, a first channel and a second channel are defined on the housing, and the first channel and the second channel are perpendicular to each other and communicated to each other. The first channel is configured to guide the filament material. The gear, the measurement device, the connecting member, and the pressing member are sequentially received in the second channel.

In some embodiments, the second channel includes a receiving cavity and a guiding groove, the receiving cavity is located between the first channel and the guiding groove. The support, the gear, and the measurement device are received in the receiving cavity. The connecting member and the pressing member are movably placed in the guiding groove.

In some embodiment, the pressing member is connected to the guiding groove by a threaded connection.

In some embodiment, an observation window is defined on the housing, the observation window is communicated with the receiving cavity. The gear and the measurement device exposed through the observation window.

In some embodiments, the feed detection apparatus further includes a feeding tube that is located in the first channel, the filament material is received in the feeding tube. One side of the feeding tube defines an opening that communicates with the second channel, the gear abuts against the filament material through the opening.

Embodiments of the present application further discloses a 3D printer, the 3D printer includes the above-mentioned feed detection apparatus.

The 3D printer and the feed detection apparatus disclosed in the present application utilizes a simple combination of connecting members and pressing members to press the gear abut against the filament material, allowing the filament material to drive the gear to move. The measurement device is configured to measure the rotating speed of the gear, and the feeding status of the filament material is determined based on a measurement result, which effectively detects multiple problems associated with filament material feeding, such as shortages, breakages, spool tangles, or nozzle blockages.

DESCRIPTION OF MAIN COMPONENTS OR ELEMENTS

Figure 1:
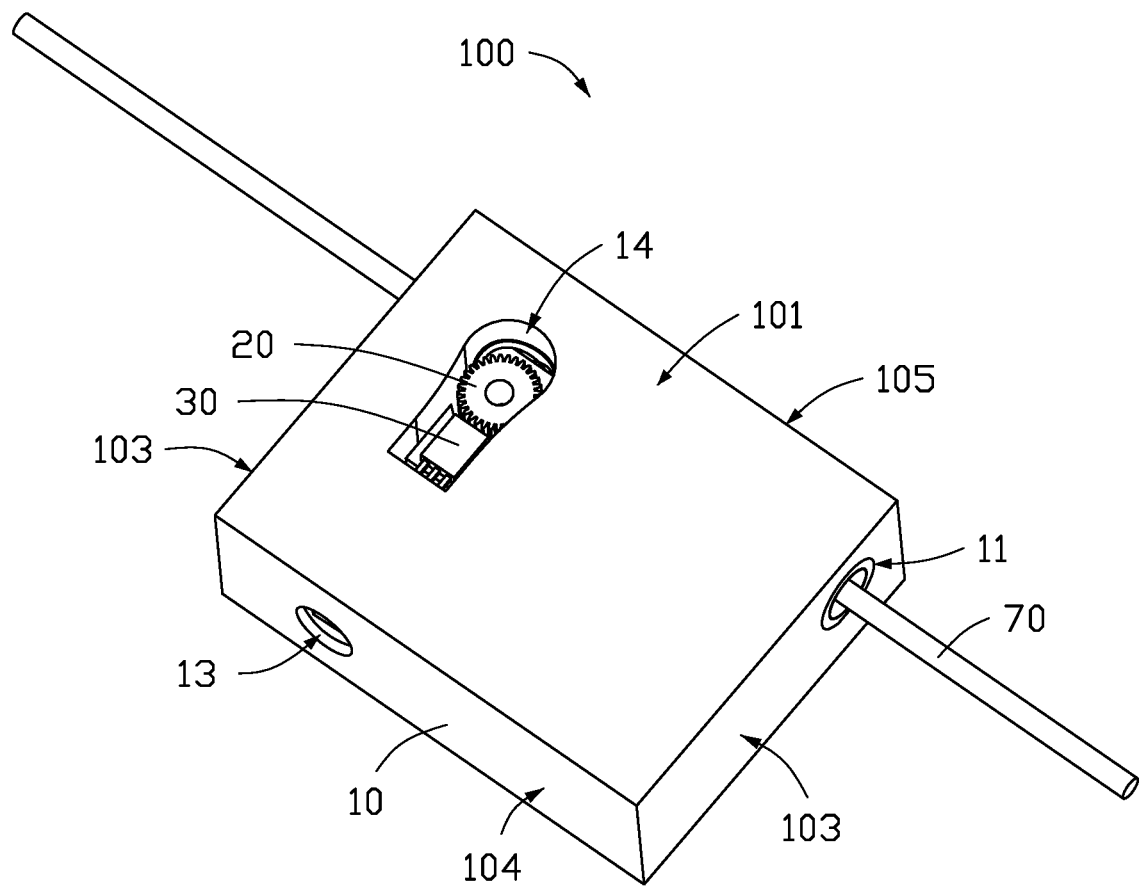
FIG. 1 is a schematic drawing of a feed detection apparatus according to an embodiment of the present disclosure.

Feed detection apparatus 100;
3D printer 200;
housing 10;
first surface 101;
second surface 102;
side wall 103;
bottom wall 104;
top wall 105;
first channel 11;
second channel 12;
receiving cavity 121;
guiding groove 122;
through hole 13;
observation window 14;
gear 20;
center hole 21;
measurement device 30;
support 40;
first mounting portion 41;
positioning hole 411;
second mounting portion 42;
positioning protrusion 421;
compression assembly 50;
connecting member 51;
pressing member 52;
groove 521;
feeding tube 60;
opening 61;
flange 62;
filament material 70.

DETAILED DESCRIPTION

In conjunction with the drawings in the present application, the technical solutions in the embodiments of the present application will be described clearly and comprehensively. The embodiments described are only a part of embodiments of the present application and do not cover all possible embodiments. Based on the embodiments of the present application, any other embodiments that can be obtained by those skilled in the art without creative effort are also within the scope of protection of the present application.

It should be noted that, when an element is referred to as "fixed to" another element, it can be directly on the other element or there may be an intermediate element. When an element is regarded as "connected to" another element, it can be directly connected to the other element or there may be an intermediate element at the same time. When an element is regarded as "placed on" another element, it can be directly placed on the other element or there may be an intermediate element at the same time. The terms "vertical", "horizontal", "left", "right", and other similar expressions used in this document are for illustrative purposes only.

Unless otherwise defined, all technical and scientific terms used in this document have the same meaning as commonly understood by those skilled in the art belonging to the technical field of the present application. The terms used in the specification of the present application are for the purpose of describing specific embodiments and are not intended to limit the scope of the present application. The terms "or/and" used in this document include any and all combinations of one or more of the associated listed items.

The present application discloses a feed detection apparatus for a 3D printer, including a gear, a measurement device, a support, and a compression assembly. The gear is mounted on the support to abut against the filament material, and the gear rotates with a movement of the filament material. The measurement device is mounted on the support to measure a rotating speed of the gear, and determines a feeding status of the filament material based on a measurement result. The compression assembly is located on a side of the support back away from the filament material. The compression assembly includes a connecting member and a pressing member. The connecting member is placed between the support and the pressing member, the pressing member is configured to regulate a pressure of the connecting member applied on the support, so that the gear abuts against the filament material.

The disclosed feed detection apparatus of the 3D printer utilizes a simple combination of connecting members and pressing members to press the gear abut against the filament material, allowing the filament material to drive the gear to move. The measurement device is used to measure the rotating speed of the gear, and the feeding status of the filament material is determined based on the measurement result, which effectively detects multiple problems associated with filament material feeding, such as shortages, breakages, spool tangles, or nozzle blockages.

Some embodiments of the present application are described in detail. The following embodiments and features thereof can be combined with each other as long as they do not conflict.

Figure 2:
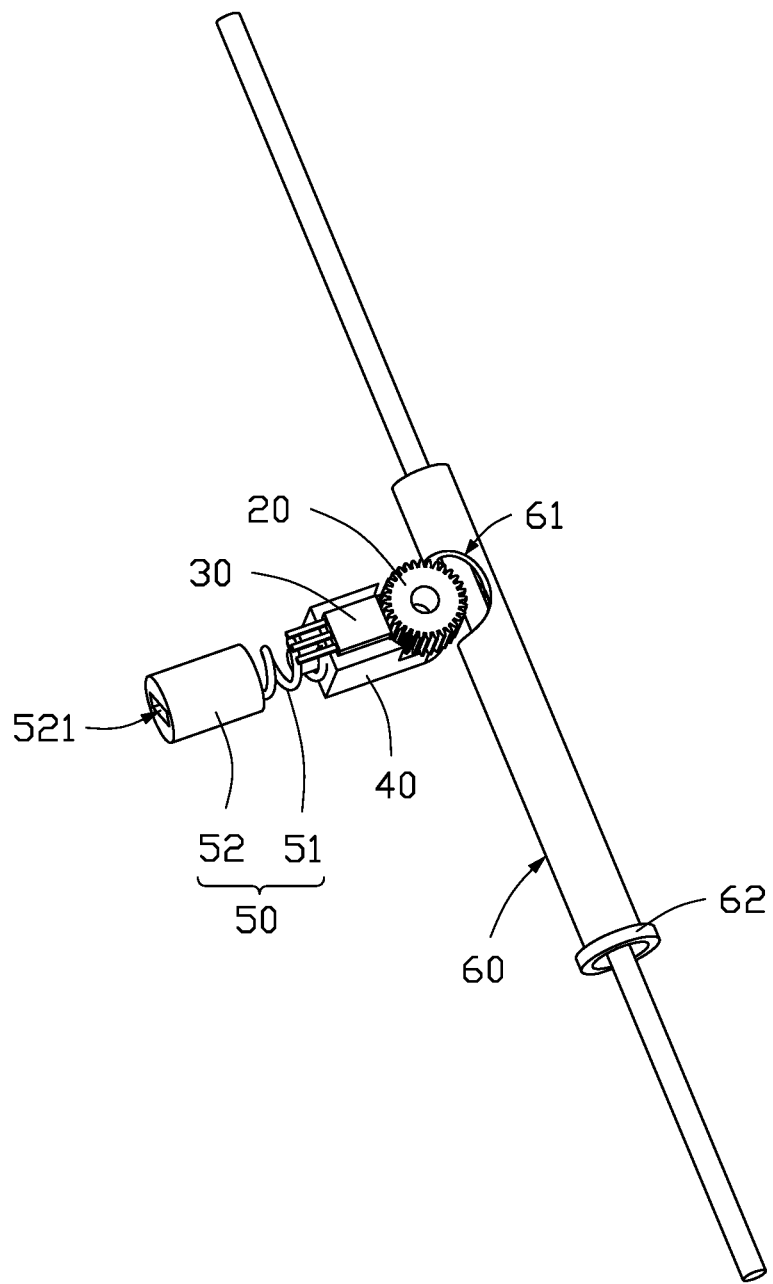
FIG. 2 is a schematic drawing of the feed detection apparatus shown in FIG. 1 without a housing.

Referring to FIG. 1 and FIG. 2, in one embodiment, the feed detection apparatus 100 of the 3D printer includes a housing 10, a gear 20, a measurement device 30, a support 40, and a compression assembly 50. The gear 20, the measurement device 30, the support 40, and the compression assembly 50 are all placed in the housing 10. The gear 20 is mounted on the support 40 to abut against a filament material 70, and the gear 20 rotates with a movement of the filament material 70. The measurement device 30 is mounted on the support 40 to measure a rotating speed of the gear 20 and determines feeding status of the filament material 70 based on the measurement result. The compression assembly 50 is located on a side of the support 40 back away from the filament material 70.

Figure 3:
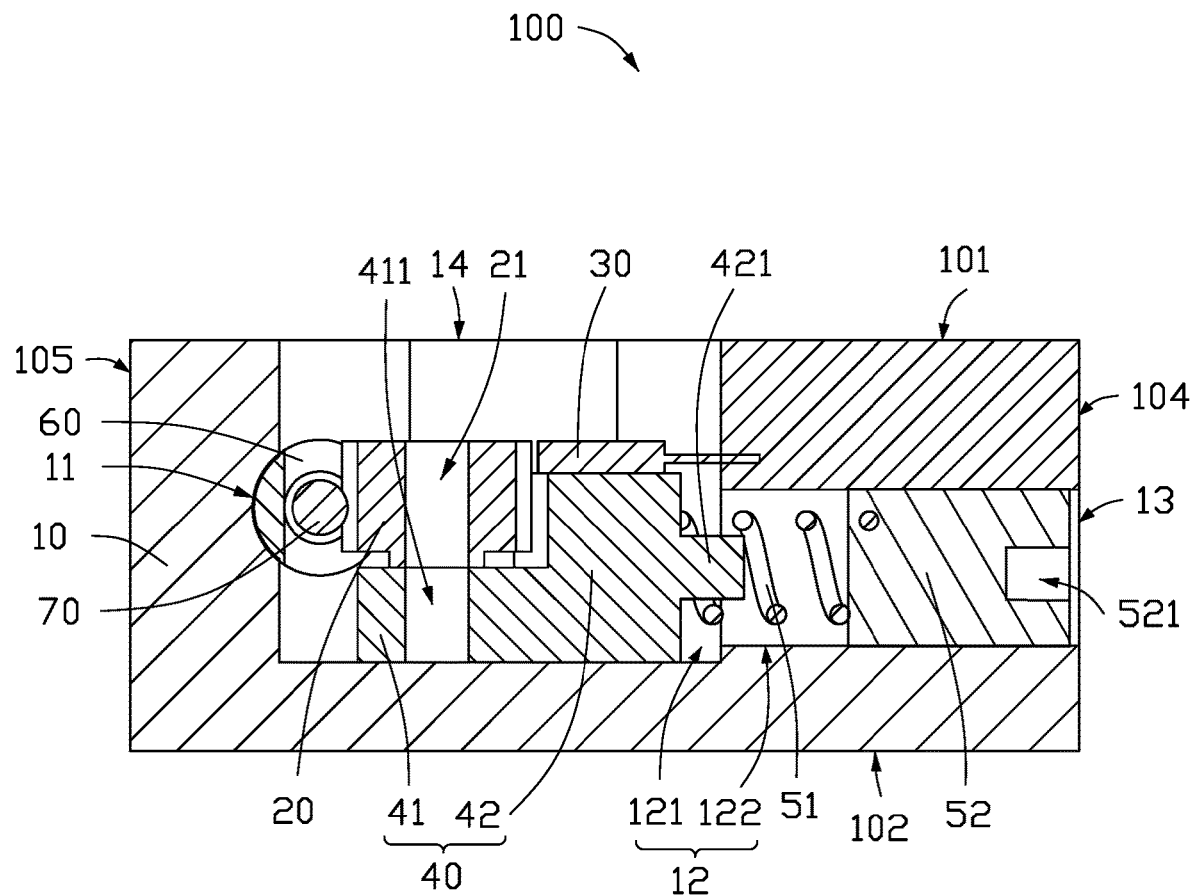
FIG. 3 is a cross-sectional view of the feed detection apparatus shown in FIG. 1.

Referring to FIG. 1 and FIG. 3, the housing 10 is roughly a rectangular structure with an internal hollow space. Outer surface of the housing 10 includes a first surface 101, a second surface 102, two side walls 103, a bottom wall 104, and a top wall 105. The first surface 101 and the second surface 102 are opposite to each other. The two side walls 103 are opposite to each other and connect the first surface 101 and the second surface 102. The bottom wall 104 and the top wall 105 are opposite to each other and connects the first surface 101, the second surface 102, and the side walls 103. A first channel 11 and a second channel 12 are defined in the housing 10, and the first channel 11 and the second channel 12 are perpendicular to each other. The first channel 11 penetrates the two side walls 103 and is configured to guide the filament material 70. The gear 20, the measurement device 30, the support 40, and the compression assembly 50 are all placed in the second channel 12. The second channel 12 includes a receiving cavity 121 and a guiding groove 122. The receiving cavity 121 is located between the first channel 11 and the guiding groove 122. In an extending direction from the top wall 105 to the bottom wall 104, the receiving cavity 121 and the guiding groove 122 are arranged in sequence. The support 40, the gear 20, and the measurement device 30 are placed in the receiving cavity 121. The compression assembly 50 is movably placed in the guiding groove 122. A through hole 13 is defined on the bottom wall 104. The through hole 13 is coaxially arranged with the guiding groove 122. The compression assembly 50 can be mounted into the guiding groove 122 from the through hole 13. An observation window 14 is defined on the first surface 101. The observation window 14 communicates with the receiving cavity 121. The gear 20, the measurement device 30, and part of the filament material 70 are exposed through the observation window 14, allowing the contact situation between the gear 20 and the filament material 70 to be observed.

The measurement device 30 includes, but is not limited to, a Hall speed sensor, which can generate periodic pulse signals in the measurement device 30, during the gear 20 rotates with the movement of the filament material 70. By analyzing the pulse signals, a rotating speed of the gear 20 and a moving speed of the filament material 70 can be obtained, and a feeding speed of the filament material 70, a used amount of filament material 70, and a remaining amount of filament material 70 in the spool can be calculated. The calculated results can be matched with the printing model to obtain the remaining printing time, prompt whether the remaining filament material are sufficient, and other functions. Meanwhile, by analyzing the pulse signal, it is also possible to detect problem of filament material not feeding when problems such as material tangling in the spool, breakage of filament material, material milling in the extruder, and blockage of the printing nozzle occur. The measurement device 30 can also issue an alarm prompt and interrupt the printing process based on the analysis results, effectively and reliably avoiding losses caused by being unable to detect the aforementioned problems.

Referring to FIG. 2 and FIG. 3. the support 40 includes a first mounting portion 41 and a second mounting portion 42 connected the first mounting portion 41. The first mounting portion 41 faces the filament material 70, and the second mounting portion 42 faces a connecting member 51. The gear 20 is mounted on the first mounting portion 41. The measurement device 30 is fixedly mounted on an upper surface of the second mounting portion 42 and is parallel to the gear 20. A positioning hole 411 is defined on the first mounting portion 41. A center hole 21 is defined on the gear 20. The positioning hole 411 and the center hole 21 are coaxially arranged, and a center shaft (not shown) of the gear 20 can be inserted into the positioning hole 411 and the center hole 21 to ensure that the position of the gear 20 relative to the support 40 is relatively fixed, and the periphery of the gear 20 abuts against the filament material 70. A positioning protrusion 421 is positioned on one side of the second mounting portion 42 facing the compression assembly 50. The positioning protrusion 421 is coupled with the compression assembly 50.

The compression assembly 50 includes the connecting member 51 and a pressing member 52. The connecting member 51 is placed between the support 40 and the pressing member 52. The pressing member 52 is configured to regulate the pressure of the connecting member 51 applied on the support 40, so that the gear 20 abuts against the filament material 70. The pressure of the gear 20 on the filament material 70 can be adjusted through the pressing member 52, avoiding slipping of the gear 20 due to insufficient pressure, or avoiding increasing feeding resistance and extrusion load of the gear 20 when the pressure is too high.

In one embodiment, the connecting member 51 is an elastic element, such as a spring or elastic plunger. Two ends of the connecting member 51 are respectively abutted against the support 40 and the pressing member 52. The pressing member 52 moves along the guide groove 122 to change the deformation amount of the connecting member 51, thereby adjusting the pressure on the support 40. The positioning protrusion 421 is inserted into the connecting member 51, which not only ensures the connection between the support 40 and the connecting member 51 but also helps to transmit the pressure applied by the connecting member 51 to the gear 20. In other embodiments, the connecting member 51 may also be a folding mechanical arm, a torsion spring, etc., as long as it can meet the function of elastic adjustment. The present application is not limited to this.

The pressing member 52 is threadedly connected to the guide groove 122. The threaded connection can not only position the pressing member 52 but also adjust the feed amount of the pressing member 52 to prevent sudden increases or decreases in pressure. A groove 521 is defined on one end of the pressing member 52 facing the through hole 13. The groove 521 is configured to connect a driving member to rotate the pressing member 52 and make a movement of the pressing member 52 in the guide groove 122.

By placing the gear 20, the connecting member 51, and the pressing member 52 at a same side of the filament material 70, the present application simplifies the transmission structure and uses the connecting member 51 to adjust the pressure of the gear 20 on the filament material 70, maintaining a good contact between the gear 20 and the filament material 70 to prevent slipping of the gear 20 or an increase in feeding resistance, and preventing the measurement device 30 from misjudging the feeding situation.

The feed detection apparatus 100 further includes a feeding tube 60. The feeding tube 60 is fixedly positioned in the first channel 11. The filament material 70 is received in the feeding tube 60. One side of the feeding tube 60 is provided with an opening 61 communicating with the second channel 12. The gear 20 presses the filament material 70 in the feeding tube 60 from the opening 61. A flange 62 is positioned at one end of the feeding tube 60. The flange 62 is fixedly placed on the side wall 103 of the housing 10 to prevent the feeding tube 60 from sliding in the first channel 11.

In other embodiments, the housing 10 can also be omitted, ensuring that the compression assembly 50 presses the gear 20 against the filament material 70, and the measurement device 30 can smoothly measure the rotating speed of the gear 20.

Figure 4:
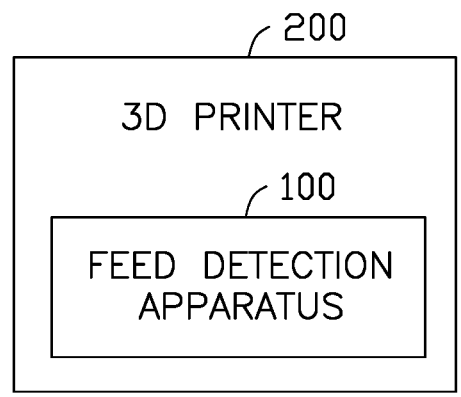
FIG. 4 is a schematic diagram of a 3D printer according to an embodiment of the present disclosure.

Referring to FIG. 4, some embodiments of the present application discloses a 3D printer 200. The 3D printer includes the feed detection apparatus 100 described in the aforementioned embodiment. The feed detection apparatus 100 is configured to detect the feeding status of the 3D printer and issues an alarm signal based on abnormal feeding information.

The above embodiments are only used to describe the technical solution of the embodiments of the application, not the limitations. Although the embodiments of the application have been described in detail with reference to the above preferred embodiments, ordinary technicians in the art should understand that the technical solution of the embodiments of the application can be modified or replaced equivalently, which should not be divorced from the spirit and scope of the technical solution of the embodiments of the application.

What is claimed is:

1. A feed detection apparatus for a 3D printer, the feed detection apparatus configured to detect a filament material, the feed detection apparatus comprising:
   a housing;
   a support;
   a gear mounted on the support to abut against the filament material, the gear rotating with a movement of the filament material;
   a measurement device mounted on the support to measure a rotating speed of the gear, and to determine a feeding status of the filament material based on the measured rotating speed of the gear; and
   a compression assembly comprising a connecting member and a pressing member, the connecting member being between the support and the pressing member, and the pressing member being configured to regulate a pressure of the connecting member applied on the support such that the gear abuts against the filament material;
   wherein a first channel and a second channel are defined on the housing, the first channel is connected to the second channel, the second channel is located on a side of the first channel, the first channel is configured to guide the filament material, the compression assembly is located on a side of the support away from the first channel, the gear, the measurement device, the connecting member, and the pressing member are sequentially received in the second channel, and the pressing member is rotatably coupled to the housing in the direction of extension of the second channel.

2. The feed detection apparatus as claimed in claim 1, wherein a positioning hole is defined on the support, a center hole is defined on the gear, and the positioning hole is coaxially provided and connected to the center hole.

3. The feed detection apparatus as claimed in claim 1, wherein the connecting member is an elastic element, and two ends of the connecting member respectively abut against the support and the pressing member.

4. The feed detection apparatus as claimed in claim 1, wherein a positioning protrusion is positioned on a side of the support facing the compression assembly, and the positioning protrusion is inserted into the connecting member.

5. The feed detection apparatus as claimed in claim 1, wherein the first channel and the second channel are perpendicular to each other and communicate to each other.

6. The feed detection apparatus as claimed in claim 5, wherein the second channel comprises a receiving cavity and a guiding groove, the receiving cavity is located between the first channel and the guiding groove, the support, the gear, and the measurement device are received in the receiving cavity, and the connecting member and the pressing member are movably placed in the guiding groove.

7. The feed detection apparatus as claimed in claim 6, wherein the pressing member is connected to the guiding groove by a threaded connection.

8. The feed detection apparatus as claimed in claim 6, wherein an observation window is defined on the housing, and the observation window communicates with the receiving cavity such that the gear and the measurement device are exposed through the observation window without being obscured.

9. The feed detection apparatus as claimed in claim 6, wherein an outer surface of the housing comprises a first surface, a second surface, two side walls, a bottom wall, and a top wall; the first surface and the second surface are opposite to each other; the two side walls are opposite to each other and connect the first surface and the second surface; the bottom wall and the top wall are opposite to each other and connect the first surface, the second surface, and the side walls; the first channel penetrates the two side walls; in an extending direction from the top wall to the bottom wall, the receiving cavity and the guiding groove are arranged in sequence; and a through hole is defined on the bottom wall, the through hole being coaxially arranged with the guiding groove.

10. The feed detection apparatus as claimed in claim 9, wherein a groove is defined on one end of the pressing member facing the through hole, and the groove is configured to connect a driving member to rotate the pressing member and make a movement of the pressing member in the guiding groove.

11. The feed detection apparatus as claimed in claim 5, wherein the feed detection apparatus further comprises:
   a feeding tube placed in the first channel, wherein the filament material is received in the feeding tube, one side of the feeding tube defines an opening that communicates with the second channel, and the gear abuts against the filament material through the opening.

12. The feed detection apparatus as claimed in claim 11, wherein a flange is positioned at one end of the feeding tube, and the flange is fixedly placed on a side wall of the housing to prevent the feeding tube from sliding in the first channel.

13. The feed detection apparatus as claimed in claim 1, wherein the support comprises a first mounting portion and a second mounting portion connected to the first mounting portion, the first mounting portion faces the filament material, the second mounting portion faces the connecting member, the gear is mounted on the first mounting portion, and the measurement device is fixedly mounted on an upper surface of the second mounting portion.

14. A 3D printer, characterized in that the 3D printer comprises a feed detection apparatus according to claim 1.

15. The 3D printer as claimed in claim 14, wherein a positioning hole is defined on the support, a center hole is defined on the gear, and the positioning hole is coaxially provided and connected to the center hole.

16. The 3D printer as claimed in claim 14, wherein the connecting member is an elastic element, and two ends of the connecting member respectively abut against the support and the pressing member.

17. The 3D printer as claimed in claim 14, wherein a positioning protrusion is positioned on a side of the support facing the compression assembly, and the positioning protrusion is inserted into the connecting member.

18. The 3D printer as claimed in claim 14,
   wherein the first channel and the second channel are perpendicular to each other and communicate to each other.

19. The 3D printer as claimed in claim 18, wherein the second channel comprise a receiving cavity and a guiding groove, the receiving cavity is located between the first channel and the guiding groove; the support, the gear, and the measurement device are received in the receiving cavity, and the connecting member and the pressing member are movably placed in the guiding groove.

20. The 3D printer as claimed in claim 19, wherein the pressing member is connected to the guiding groove by a threaded connection.

* * * * *